US005424118A

United States Patent [19]

McLaughlin

[11] Patent Number: 5,424,118

[45] Date of Patent: Jun. 13, 1995

[54] INTERLOCKING INSULATIVE PANEL CONSTRUCTION

[75] Inventor: Randolph W. McLaughlin, Laurel, Miss.

[73] Assignee: Mid-South Industries, Inc., Laurel, Miss.

[21] Appl. No.: 186,359

[22] Filed: Jan. 25, 1994

[51] Int. Cl.[6] ............................ E04C 1/10; B32B 3/20

[52] U.S. Cl. ............................... 428/314.8; 428/318.6; 428/613; 428/623; 428/636; 52/588.1; 52/589.1; 52/592.1

[58] Field of Search ................. 52/588.1, 589.1, 592.1; 428/314.4, 318.6, 319.7, 623, 636, 314.8, 613

[56] References Cited

U.S. PATENT DOCUMENTS 1,231,854 7/1917 Cox .
3,132,447 5/1964 Hosbein .
3,197,930 8/1965 Kimmlinger .
3,239,984 3/1966 Hosbein .
4,031,678 6/1977 Schuring .
4,037,377 7/1977 Howell et al. ................. 52/592.1 X
4,104,840 8/1978 Heintz et al. .................. 52/588.1 X
4,143,498 3/1979 Martin, Jr. et al. ........... 52/592.1 X
4,236,366 12/1980 Rijnders ......................... 52/592.1 X
4,254,178 3/1981 Church .
4,351,873 9/1982 Davis .
4,736,558 4/1988 Taraba .
4,755,408 7/1988 Noel ....................................... 428/36
4,794,030 12/1988 Celia .
4,998,396 3/1991 Palmersten ......................... 52/588.1
5,011,402 4/1991 Hammond .
5,117,604 6/1992 Bly et al. .

*Primary Examiner*—George F. Lesmes
*Assistant Examiner*—Blaine R. Copenheaver
*Attorney, Agent, or Firm*—David H. Semmes

[57] ABSTRACT

Refrigeration units such as walk-in coolers and freezers, particularly interlocking insulative panels used in construction of such units. The individual insulative panels are characterized by a densified urethane perimeter and a core of low density insulating urethane abutting the perimeter and held in place by a thin outer skin. The densified urethane perimeters of the panels have a tongue-in-groove configuration, as well as a cam locking means, securing abutting panels together.

1 Claim, 4 Drawing Sheets

INTERLOCKING INSULATIVE PANEL CONSTRUCTION

CROSS-REFERENCES TO RELATED APPLICATIONS

None.

SUMMARY OF THE INVENTION

The present invention is directed to walk-in coolers and freezers, particularly interlocking insulative panels used in modular construction. The panels utilize a 4" thick core of low density urethane foamed insulation within a densified urethane perimeter. The panel perimeters are of tongue and groove configuration and cam locking means is seated adjacent the tongue configuration to engage a pin mounted adjacent the groove configuration for interlocking of abutting panels. The consequent panels have increased strength and rigidity, yet are lightweight and have high insulative value.

DESCRIPTION OF THE PRIOR ART

| | |
|---|---|
| COX | 1,231,854 |
| HOSBEIN | 3,132,447 |
| KIMMLINGER et al. | 3,197,930 |
| HOSBEIN | 3,239,984 |
| SCHURING | 4,031,678 |
| CHURCH et al. | 4,254,178 |
| DAVIS | 4,351,873 |
| TARABA | 4,736,558 |
| CELIA | 4,794,030 |
| HAMMOND | 5,011,402 |
| BLY et al. | 5,117,604 |

The aforelisted patents show tongue in groove locking panel constructions but do not suggest applicant's use of a high density urethane perimeter combined with low density foamed urethane insulation.

Figure 1:
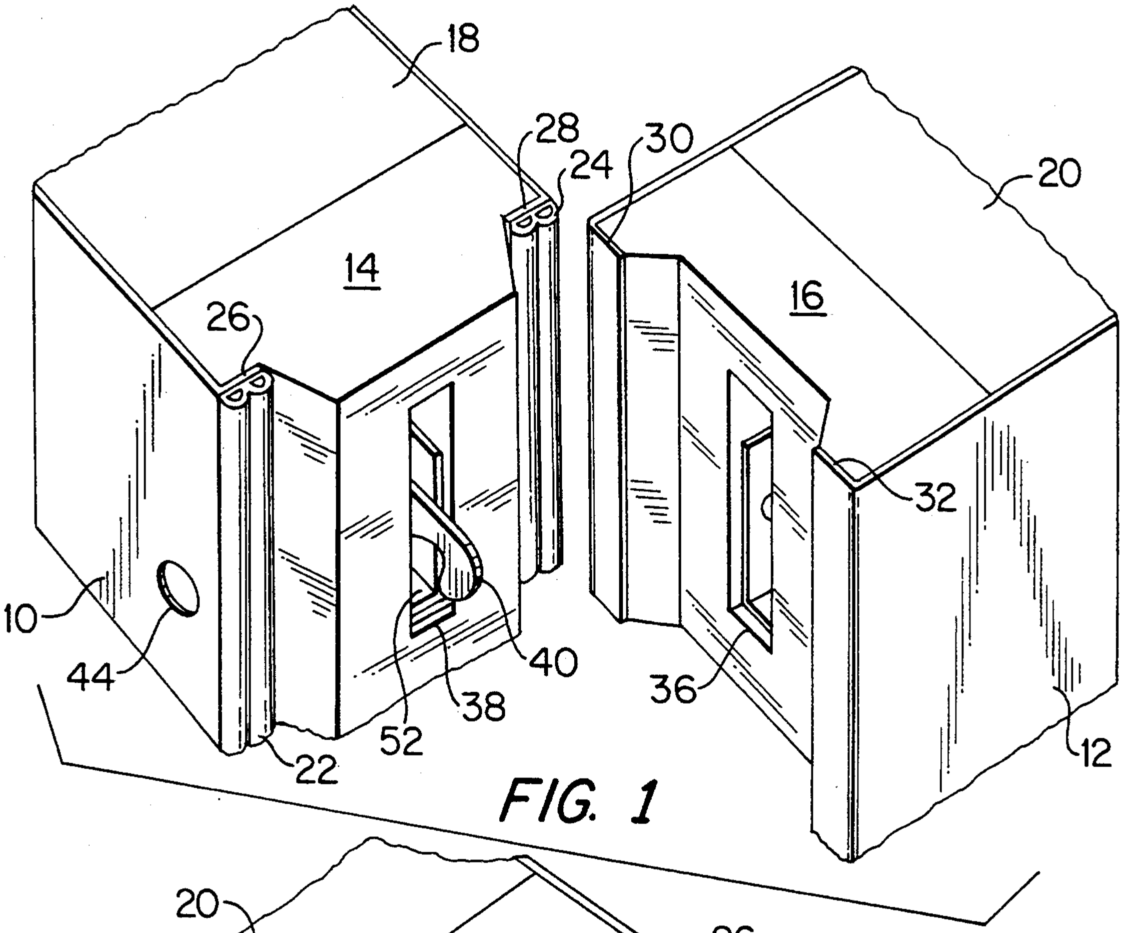
FIG. 1 is a fragmentary perspective view, partially in horizontal section, showing the tongue in groove complementarity of interlocking panels and the cam action hook arm assembly extending from the tongue perimeter to the groove perimeter.

DESCRIPTION OF THE PREFERRED EMBODIMENT:

In FIG. 1 interlocking panels 10 and 12 are shown as comprised of low density urethane foamed insulative centers 18, 20 and high density urethane (e.g. DURATHANE®) perimeter in the form of complemental tongue element 14 and groove element 16. Panel 10, having tongue element 14 may employ vertical sealing gaskets 22, 24, fitted to the exterior metallized skin bent edges 26, 28.

Panel 12 may include metallized skin bent edges 30, 32 formed about the forward edge of groove 14 and locking pin perture 36.

Panel 10, tongue element 14 may include cam locking aperture 38 into which there is fitted U-shaped bracket 52 having vertical plates 64, 66, so as to seat pivoted cam 40.

Figure 2:
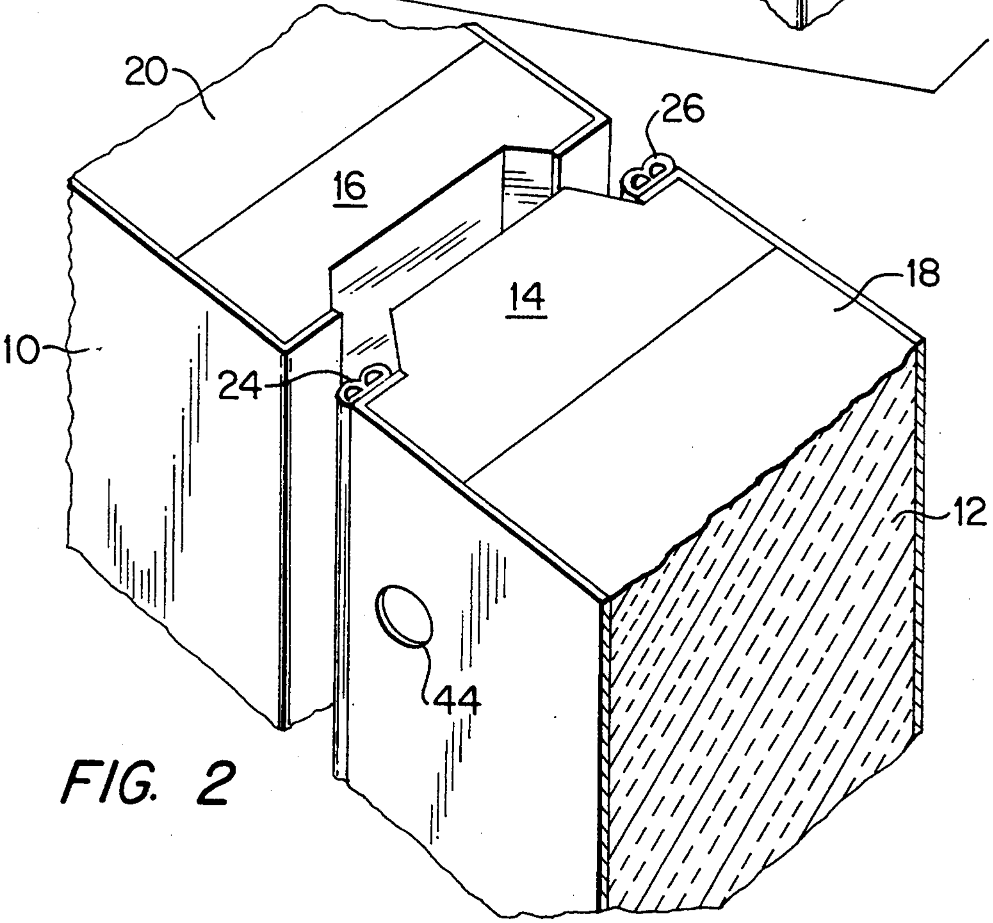
FIG. 2 is a similar fragmentary view, partially in horizontal section, showing the interlocking panels aligned prior to cam locking by means of a hex wrench and access port.
Figure 3:
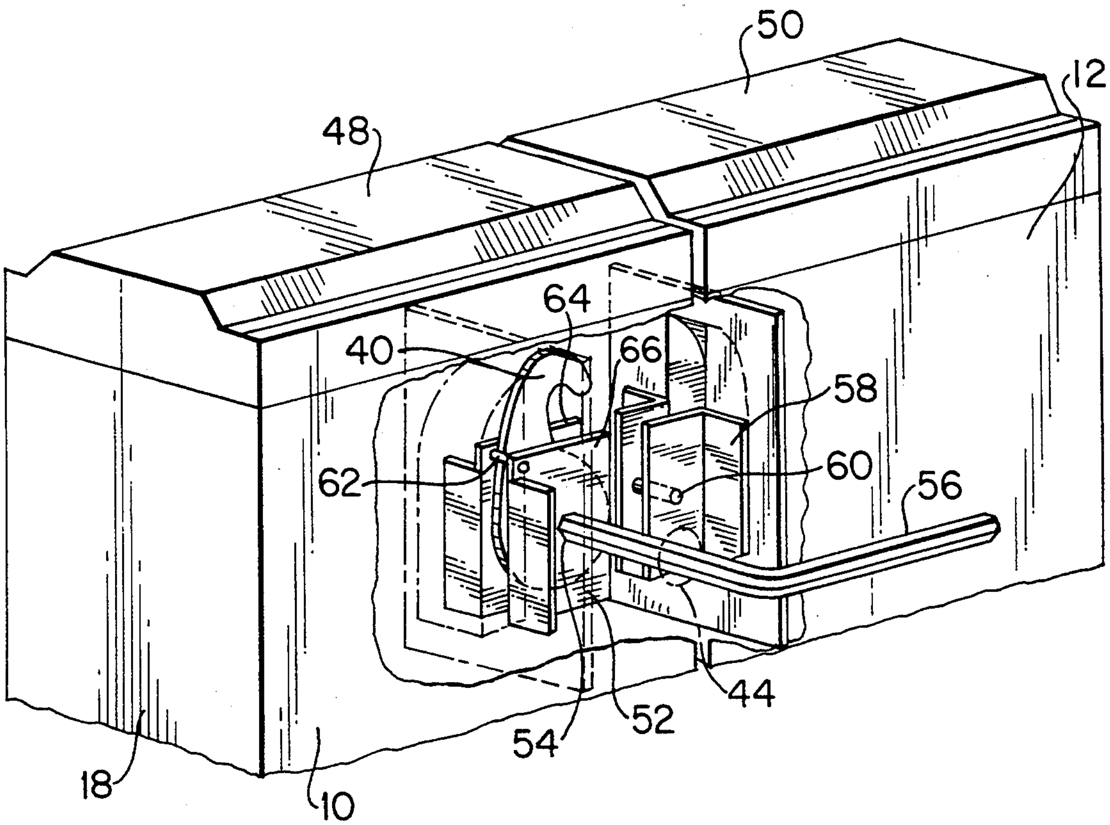
FIG. 3 is a fragmentary view, partially in vertical section, showing in phantom, the cam lock assembly, as activated by a hex wrench.

In FIGS. 2 and 3, panel elements 10, 12 are shown as aligned for locking by insertion of a hex wrench 56 into access port 44.

In FIG. 3, panel 10 is shown as supporting U-shaped bracket 52 having hex aperture 54 for complemental engagement with an end of hex wrench 56. Cam lever 40 is thus actuable by hex wrench 56, as limited by horizontal pin 62, to engage locking pin 60 seated in bracket 58 supported within panel 12. As will be apparent, U-shaped bracket 52, as well as plates 64, 66 are mounted in the densified urethane perimeter 14 to rigidize the assembly.

Figure 9:
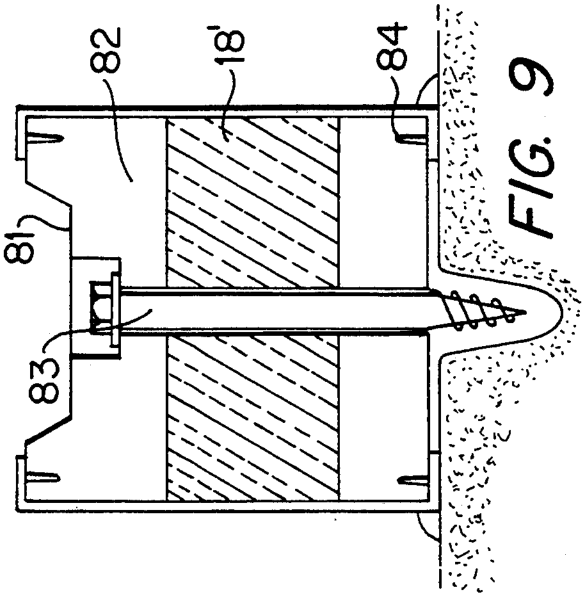
FIG. 9 is a vertical section of a foamed screed to which a a panel lower edge may be fitted.
Figure 8:
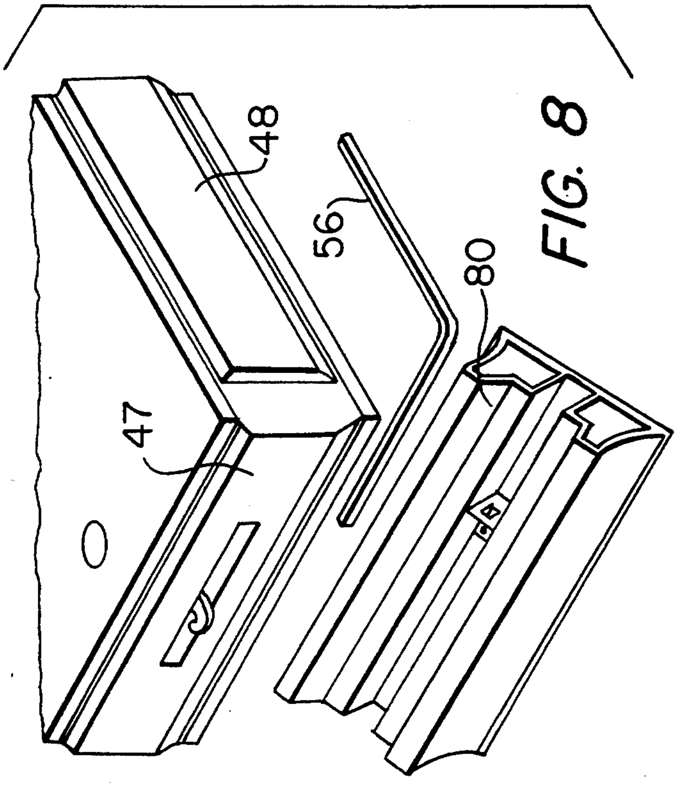
FIG. 8 is a fragmentary perspective, showing the cam locking of an insulating panel lower edge to a vinyl screed.

The top and bottom densified perimeters 48, 50 of panels 10, 12 may be molded in tongue configuation for complemental fitting with either a vinyl screed 80, such as illustrated in FIG. 8 or a foamed screed 82, as illustrated in FIG. 9.

Figure 4:
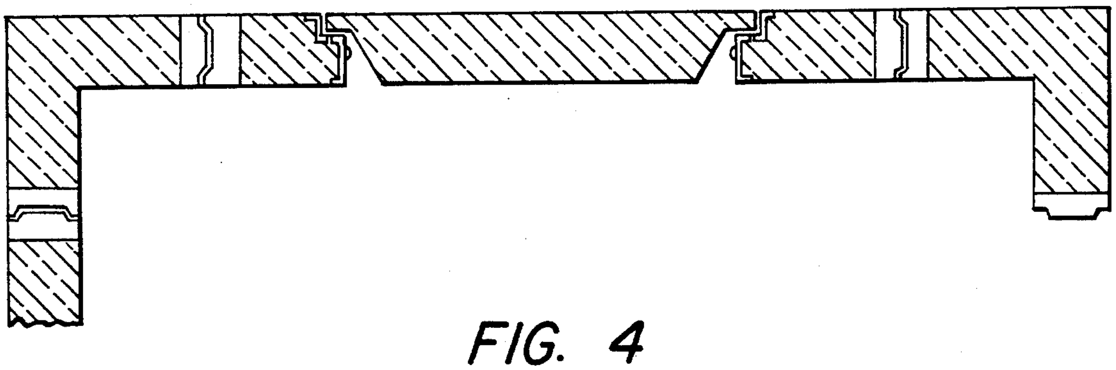
FIG. 4 is a transverse section taken through a typical 46" door frame of a walk-in refrigeration unit, constructed according to the present invention.

In FIG. 4 there is illustrated a conventional walk-in freezer door frame comprised of interlocking insulative panels, constructed according to the present invention.

Figure 5:
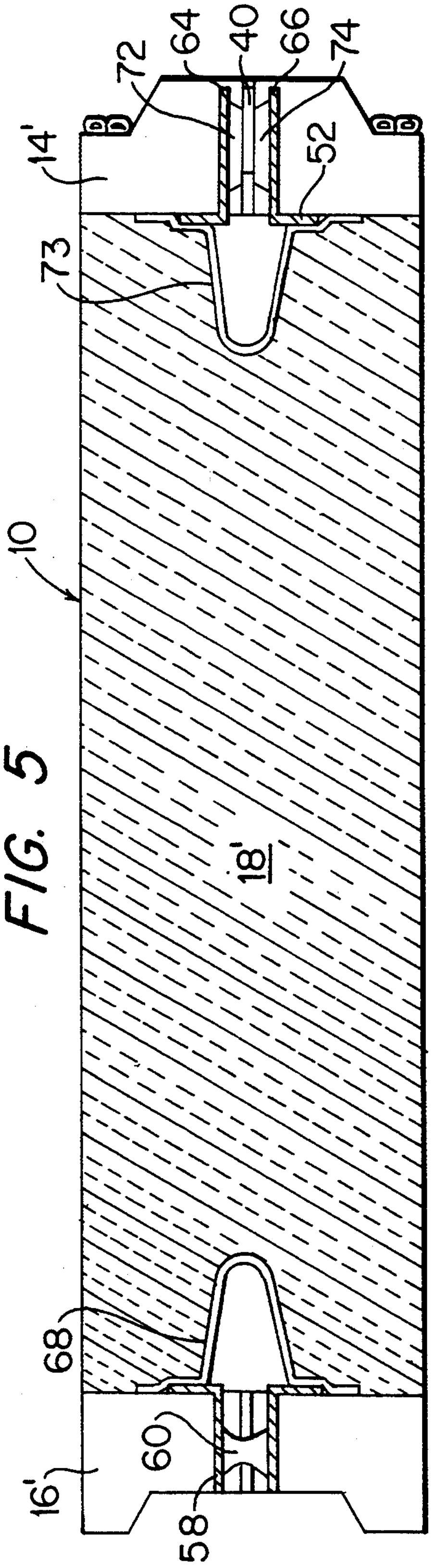
FIG. 5 is a transverse section of an insulating panel, showing the high density urethane perimeter and the low density foamed interior, as well as the cam lock and pin assembly.

In FIG. 5 there is illustrated a panel 10 constructed according to the present invention and having densified perimeter tongue element 14' at one vertical edge and densified groove element 16' at the opposed vertical edge.

Cam lock 40 is mounted within metallized recess 73 by means of bracket 52, vertical plates 64, 66. Camming surfaces 72, 74 may be secured to plates 64, 66, so as to engage the surface of cam 40. On the other edge of the panel, densified urethane perimeter groove construction 16 is illustrated as having pin assembly 60 mounted within metallized recess 68 by means of bracket 58.

Figure 6:
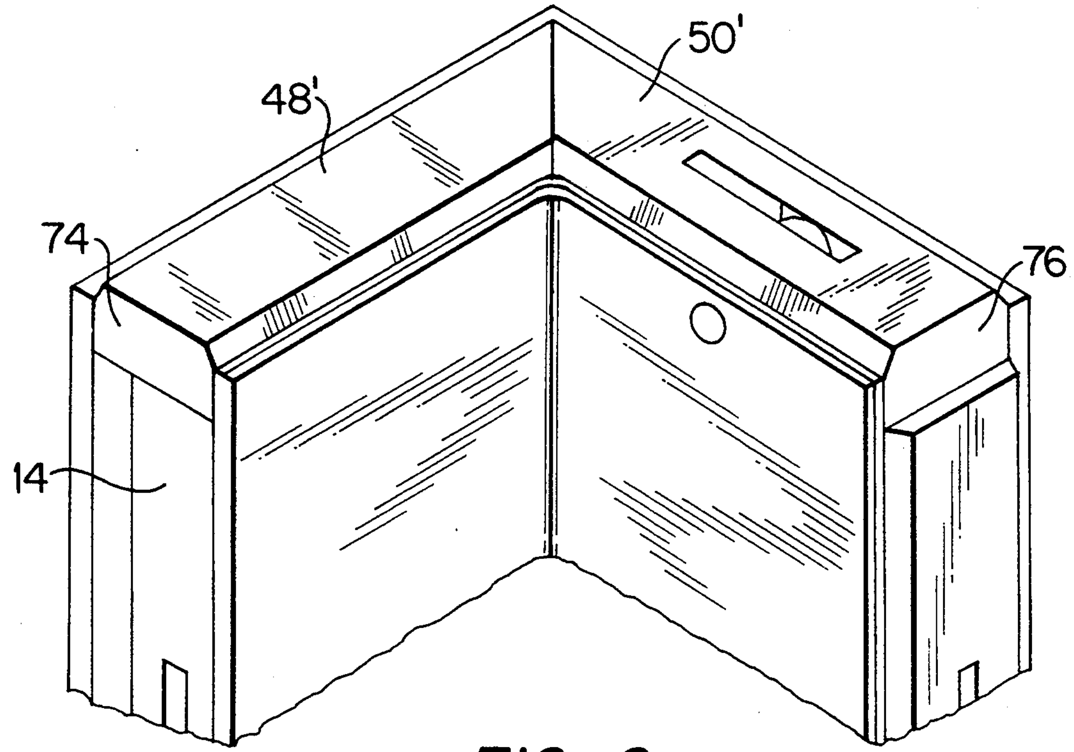
FIG. 6 is a fragmentary perspective of a corner panel construction.

In FIG. 6 a corner panel is shown, as including top densified sections 48', 50' with molded and complementary fitted end elements 74 and 76.

Figure 7:
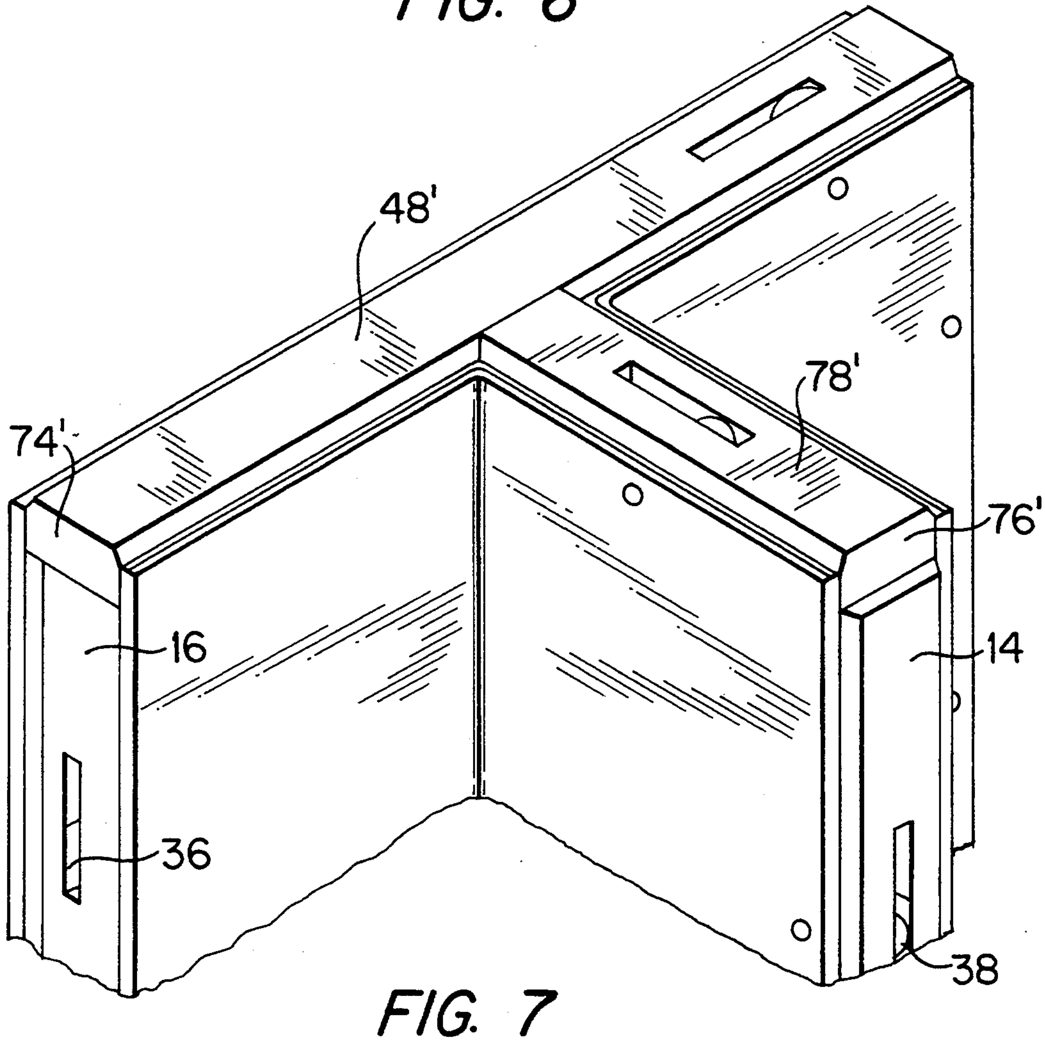
FIG. 7 is a fragmentary perspective of a T-panel construction.

In FIG. 7 there is illustrated a T-panel with densified urethane perimeter 48', 78' with molded complementary fitting end elements 74', 76'. The individual perimeter elements 48', 78' are fitted end to end by means of recess 76' engaging end edge 74', so as to essentially interlock in covering the abutting vertical tongue 14 and groove 16.

By way of example, the following specifications of interlocking insulative panels constructed according to the present invention are provided.

In FIG. 8 there is illustrated the cam locking of an insulating lower panel edge 47 to a vinyl screed 80. Manifestly, screed 80 may be secured by conventional lag bolts, or the like, to a cement floor base.

In FIG. 9 there is illustrated an alternative construction of screed 81 having densified urethane layers 82, 83 with an interior of low density urethane 18'. The entire assembly could be secured by conventional lag bolt 83, or the like, extending into a cement floor base.

PANEL CONSTRUCTION

All panels shall be standard modular size made in 46", 34½, 23"and 11½ widths. Corner panel shall form a 90° angle, 12"×12" widths. All panels shall be interchangeable. All panels shall consist of metal facings fabricated to precise dimensions by automated dies and roll forming. Metal pans are to be uniformly treated on the interior surface with a contact bonding adhesive to permanently bond to the polyurethane foam. The perimeter of the panel shall be tongue and groove DURAETHANE® high density polyurethane structural framing, glued and mechanically attached to the exterior and interior metal facings. DURATHANE® tongue and groove shall be preceisely formed by extruded molds having consistent dimensional requirements for added structural strength, precision vapor and air tight joints and to prevent pre-installation damage of the panel joints. The panel frame shall be inserted into temperature controlled steel hydraulic presses and polyurethane injected to the proper density. Polyurethane low density insulating material shall be true "foamed-in-place" and shall bond completely to the metal skins to form a rigid structural panel with excellent mchanical properties. Panels shall be 100% urethane foam insulation exclusive of metal pans or skins and shall not have internal wood or metal support, framing, straps or other non-insulating members. Panel edges shall have double-beaded vinyl sealing gasket applied to the exterior and interior side of all tongue perimeters. Gaskets shall be NSF Listed (NSF Testing Laboratory, Ann Arbor, Mich.) and shall be impervious to stains, grease, oils, mildew, sunlight, etc.

INSULATION

Insulation shall be 4" thick rigid low ozone depleting HCFC 22 blown Class 1 urethane foam classified according to UL723(ASTM-E-84), as tested by Underwriters Laboratories, Inc. The 4" core material shall have a flame spread of 25 or less and a smoke density of 250.

The urethane foam is foamed-in-place to bond to inner surfaces of metal pans having a thermal conductivity (K factor) of not more than 0.125 BTU/hr./sq.ft. per degrees Fahrenheit/inch; and an overall coefficient of heat transfer (U factor) of not more than 0.031. The R factor shall be 32.

The prefabricated urethane foam panels shall be supplied with a Class 1 fire hazard classification according to UL723(ASTM-E-84), as tested by Underwriters Laboratories, Inc. Panels shall have a flame spread rating of 25 or less with a certifying Underwriters Laboratories, Inc. label.

URETHANE FOAMING TECHNIQUE

Applicant uses the froth foaming technique to produce foam which has outstanding insulating and structural properties. Froth foaming offers many advantages over the conventional pouring processes used by many manufacturers, both in terms of better foam dispersion and the quality of foam produced.

As the foam leaves the mixing equipment to enter the metal skins of the panels, an additive is converted to a gas, producing a creamy, frothy mass. This mass has excellent flow characteristics, and achieves maximum distribution throughout the panel area. Because the pre-expansion process minimizes frictional drag, frothed foam fills the panels more completely with foam at a lower density than poured foam. Cell structure is improved and skin density is reduced.

Because froth foam is self-insulating, ambient temperatures affect it less. Thus, it is less sensitive to temperature variations during manufacture, resulting in greater quality control and more uniform panels.

Tests have proven that froth foam is as dimensionally stable as poured foam, and does not expand more than conventional pured foam when subjected to high ambient temperatures. The advantages offered by froth foam are achieved with no loss of dimensional stability.

I claim:

1. A pair of interlocking, insulative panels comprising:
   - A. a first panel including:
     - i. an inner and outer metallized skin;
     - ii. a high density urethane perimeter having sides, top and bottom secured by said inner and outer metallized skin;
     - iii. a four inch thick core of low density insulating urethane of closed cell foam prepared by a froth foaming technique, interposed between said inner and outer skins and abutting and bonded to said densified urethane perimeter, and
     - iv. a vertically extending tongue defined in a side of said first panel perimeter and limited by a complementary tongue defined in said densified perimeter top and bottom;
   - B. a second panel including:
     - i. an inner and outer metallized skin;
     - ii. a high density urethane perimeter having sides, top and bottom secured by said inner and outer metallized skin;
     - iii. a four inch thick core of low density insulating urethane of closed cell foam prepared by a froth forming technique interposed between said inner and outer skins and abutting and bonded to said densified urethane perimeter, and
     - iv. a vertically extending groove defined in one side of said second panel perimeter, and limited by a complementary tongue defined in said densified perimeter top and bottom panel, such that said vertically extending groove is complementally engagable with said vertically extending tongue defined in said first panel;
   - C. locking means in the form of a cam pivotally supported in said first panel perimeter adjacent said tongue, and engagable with a locking pin supported within said second panel adjacent said groove so as to lock said panels together, and
   - D. vertically extending sealing gaskets mounted on either side of said vertically extending tongue defined in a side of said first panel perimeter, so as to engage sealingly the abutting vertical surface of said second panel.

* * * * *